United States Patent
Granberg et al.

(10) Patent No.: US 11,657,663 B2
(45) Date of Patent: May 23, 2023

(54) PROTECTION DEVICE FOR BEING PROVIDED INSIDE A KEY FOB AND CORRESPONDING KEY CONTROL SYSTEM

(71) Applicant: SKIMSAFE HOLDING AB, Stockholm (SE)

(72) Inventors: Björn Granberg, Solna (SE); Carl Martinsson, Stockholm (SE); Kristoffer Pöljö, Bandhagen (SE); Fredrik Thorsell, Stockholm (SE)

(73) Assignee: SKIMSAFE HOLDING AB, Stockholm (SE)

( * ) Notice: Subject to any disclaimer, the term of this patent is extended or adjusted under 35 U.S.C. 154(b) by 7 days.

(21) Appl. No.: 17/423,382

(22) PCT Filed: Jan. 17, 2020

(86) PCT No.: PCT/EP2020/051160
§ 371 (c)(1),
(2) Date: Jul. 15, 2021

(87) PCT Pub. No.: WO2020/148439
PCT Pub. Date: Jul. 23, 2020

(65) Prior Publication Data
US 2022/0130195 A1 Apr. 28, 2022

(30) Foreign Application Priority Data
Jan. 18, 2019 (EP) ..................................... 19152466

(51) Int. Cl.
*G07C 9/00* (2020.01)
*H01H 36/00* (2006.01)

(52) U.S. Cl.
CPC ..... *G07C 9/00706* (2013.01); *H01H 36/0006* (2013.01); *G07C 2009/00984* (2013.01)

(58) Field of Classification Search
CPC ...... G07C 9/00706; G07C 2009/00984; G07C 9/00944; G07C 2009/00555;
(Continued)

(56) References Cited

U.S. PATENT DOCUMENTS 5,679,984 A * 10/1997 Talbot ................ G07C 9/00309
361/172
7,061,369 B2 * 6/2006 Bergerhoff .............. B60R 25/20
342/127
(Continued)

FOREIGN PATENT DOCUMENTS

| DE | 202016002888 | * | 7/2016 | |
|---|---|---|---|---|
| EP | 3434535 | | 1/2019 | |
| WO | WO-2020002921 A1 | * | 1/2020 | ............. B60R 25/24 |

OTHER PUBLICATIONS

International Search Report and Written Opinion for International (PCT) Patent Application No. PCT/EP2020/051160, dated Mar. 20, 2020, 14 pages.

*Primary Examiner* — Omar Casillashernandez
(74) *Attorney, Agent, or Firm* — Sheridan Ross P.C.

(57) ABSTRACT

It is provided a protection device for being provided inside a key fob to selectively inactivate the key fob. The protection device comprises: a first conductive layer; a second conductive layer; an insulator layer between the first conductive layer and the second conductive layer, the insulator layer preventing conductive contact between the first conductive layer and the second conductive layer; and a switch conductively coupled between the first conductive layer and the second conductive layer, the switch being wirelessly controllable to be in a conductive state or a blocking state.

9 Claims, 2 Drawing Sheets

(58) Field of Classification Search
CPC ...... G07C 2009/00587; G07C 2209/63; G07C 9/00309; B60R 25/24; B60R 25/406; H01H 36/0006; H01H 9/0235
USPC .............................................. 340/5.61, 5.72
See application file for complete search history.

(56) References Cited

U.S. PATENT DOCUMENTS

| | | | |
|---|---|---|---|
| 8,473,153 B1* | 6/2013 | Lickfelt | B60R 25/406 701/2 |
| 2006/0197660 A1* | 9/2006 | Luebke | G08B 25/009 340/3.1 |
| 2008/0284564 A1* | 11/2008 | Leitch | G07C 9/00309 340/5.61 |
| 2009/0008125 A1* | 1/2009 | Tessier | B60R 25/209 174/139 |
| 2011/0257817 A1* | 10/2011 | Tieman | B60R 25/24 701/2 |
| 2013/0166144 A1 | 6/2013 | Lickfelt | |
| 2019/0035184 A1* | 1/2019 | Okada | G07C 9/28 |

\* cited by examiner

PROTECTION DEVICE FOR BEING PROVIDED INSIDE A KEY FOB AND CORRESPONDING KEY CONTROL SYSTEM

CROSS REFERENCE TO RELATED APPLICATIONS

This application is a national stage application under 35 U.S.C. 371 and claims the benefit of PCT Application No. PCT/EP2020/051160 having an international filing date of 17 Jan. 2020, which designated the United States, which PCT application claimed the benefit of European Patent Application No. 19152466.9 filed 18 Jan. 2019, the disclosure of each of which are incorporated herein by reference.

TECHNICAL FIELD

The present disclosure relates to a protection device for protecting a key fob, and in particular to a protection device, and key fob comprising a switch being wirelessly controllable.

BACKGROUND

Access control has greatly improved both in security and in convenience for users in recent years. For instance, in the automotive industry, key fobs are typically provided with push buttons for remote control of locking and unlocking the car. The remote control removes the need for a mechanical key to open doors of a car.

A fairly recent improvement is passive access control by the car, sometimes known as the use of a smart key. In passive access control, the user keeps the key fob in a pocket or handbag and the car detects the presence of the key fob of the user and causes an access control system in the car to communicate wirelessly with the key fob. As long as the correct key fob is in the vicinity of the car and is authorised, the access control system grants access and unlocks the car. In this way, the user does not even need to handle the key fob for unlocking the car and can conveniently keep the key fob hidden.

In passive access control, the initial communication between the car and the key fob can be based on magnetic, i.e. inductive, signals which have a very limited range. In this way, it is prevented that an attacker could gain access of a car in a driveway when a key is located a few metres away, e.g. inside a front door or when a user walks away from the car. It is thus of great importance to have full control of communication range between car and key fob.

Recently, relay attacks are used to attempt to gain access where passive access control is employed. In relay attacks, one person is located by the car with a first relay device. Another person attempts to be close to a key fob (e.g. by a front door) with a second relay device. If successful, the car communicates, via the relay devices, with the key fob whereby access to the car is granted even without the attackers having physical access to the key fob.

One known way to reduce the risk of relay attacks is to place the key fob inside a metal enclosure, to block signals from the car or relay device to reach the key fob. However, such metal enclosures are bulky and inconvenient.

SUMMARY

It is an object to prevent relay attacks of an attacker attempting to gain access to a protected object which is more convenient than prior art solutions.

According to a first aspect, it is provided a protection device for being provided inside a key fob to selectively inactivate the key fob. The protection device comprises: a first conductive layer; a second conductive layer; an insulator layer between the first conductive layer and the second conductive layer, the insulator layer preventing conductive contact between the first conductive layer and the second conductive layer; and a switch conductively coupled between the first conductive layer and the second conductive layer, the switch being wirelessly controllable to be in a conductive state or a blocking state.

The switch may be a reed switch.

The protective device may further comprise a first communication module connected to the switch. In such a case, the communication module is configured to receive signals to control the state of the switch.

The first communication module may support communication using any one of Near-field communication (NFC), Bluetooth, Bluetooth Low Energy (BLE), or any of the IEEE (Institute of Electrical and Electronics Engineers) 802.15 standards.

The protection device may be configured to be provided between a pole of a battery of the key fob and a power connector of the key fob.

The protective device may further comprise a battery, in which case the protective device being provided in contact with one pole of the battery and a corresponding power connector.

According to a second aspect, it is provided a key fob comprising a battery and the protective device according to any one of the preceding claims. The protective device is then provided in contact with one pole of the battery and a corresponding power connector.

According to a third aspect, it is provided a key control system comprising the protective device according the first aspect, when the protective device comprises the first communication module. The key control system further comprises a switch controller comprising: a second communication module configured to determine a distance to a protected object; and a third communication module configured to communicate with the first communication module of the protective device; wherein the switch controller is configured to control the state of the switch of the protective device based on a distance between the switch controller and a protected object.

The second communication module may be configured to cooperate with a fourth communication module installed in the protected object to determine the distance.

The second communication module may be configured to cooperate with the fourth communication module installed in the protected object to determine the distance based on time-of-flight measurements.

The second communication module may be configured to cooperate with the fourth communication module installed in the protected object to determine the distance based on multi-carrier phase-based ranging, also referred to as multiple carrier phase difference.

The switch controller may be configured to close the switch when the distance is less than a threshold distance and open the switch when the distance is more than a threshold distance.

The third communication module may be configured to communicate with the first communication module to control the switch using an inductive signal.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, a protection device is provided which can be installed inside a key fob between its battery and a power connector. The protection device can be controlled wirelessly to be in a conductive or blocking state to thereby control whether the key fob is active and usable or not. Optionally, the protection device comprises the battery.

Figure 1:
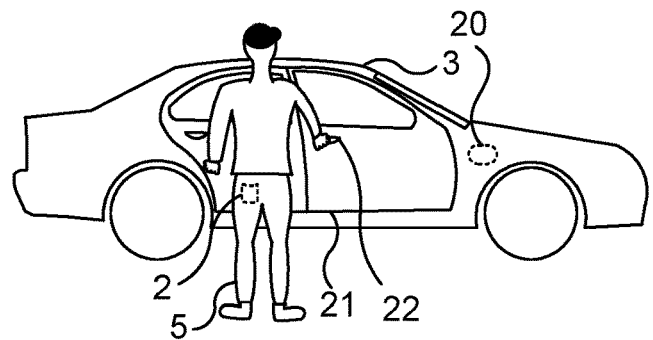
FIG. 1 is a schematic diagram illustrating the use of passive access control in an environment in which embodiments presented herein can be applied.

FIG. 1 is a schematic diagram illustrating the use of passive access control in an environment in which embodiments presented herein can be applied. A protected object 3 is here in the form of a car. It is to be noted that the protected object can be any other suitable object to which access is controlled, such as any other vehicle, a building, or other secure physical space. Hence, whenever a car is mentioned herein as a protected object, the same principles can be applied to any other protected object.

The car 3 is secured by locks which are controlled using passive access control. A user 5 keeps a key fob 2 in a pocket or bag, etc. When the car detects the presence of the user, e.g. by the user 5 touching a handle 22 of the car or the key fob 2 coming within communication rage of the car 3, access control is initiated. An access controller 20 of the car receives a signal when the presence of the user or key fob 2 is detected and attempts to communicate wirelessly with any key fob 2 in the vicinity of the car 3. Specifically, the access controller 20 here communicates with the key fob 2 of the user 5 and determines whether the key fob 2 is authorised to unlock the car 3. If this is the case, the access controller 20 unlocks the car 3 and the user can open the door 21.

As known in the art per se, the communication between the access controller 20 and the key 2 occurs at least initially using inductive (magnetic) signals to thereby effectively control communication range, since the range of inductive signals is very short. Communication based on longer range RF (Radio Frequency) waves can be used after the initial inductive communication. The inductive interface is thus configured to be short range e.g. to prevent an attacker from unlocking the car when the user is walking away from the car or when a key fob is located a few metres away from the car 3 (e.g. inside a building close to a driveway).

The passive access control can also be used for starting the car.

Figure 2:
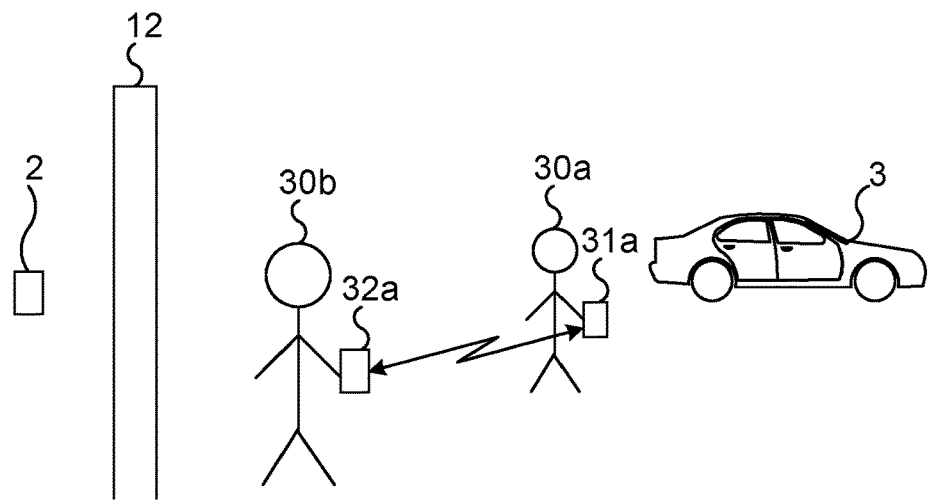
FIG. 2 is a schematic diagram illustrating a relay attack in the environment of FIG. 1.

FIG. 2 is a schematic diagram illustrating a relay attack in the environment of FIG. 1. A first person 30a is located by the car and carries a first relay device 31a. A second person 30b is located close to a key fob 2 with a second relay device 31b. The key fob 2 is physically secured inside a building wall 12 (e.g. by a front door).

The car 3 sends out a first inductive signal to communicate with any nearby key fobs. The first relay device 31a receives the inductive signal and transmits the signal to the second relay device 32a. In one embodiment, the first inductive signal is transformed the signal to a longer range RF wave-based signal and transmitted to the second relay device 32a In one embodiment, the first inductive signal is transformed to an electric signal and is transmitted to the second relay device 32a over a cable. The second relay device 32a receives the signal from the first relay device, converts received signal back to an inductive signal, to which the key fob 2 responds, since the second relay device 32a is sufficiently close. The response from the key fob 2 is picked up by the second relay device 32a transferred in the same way (e.g. via a longer range RF wave-based signal or cable) to the first relay device 31a, which transmits a corresponding response to the car 3. The car 3 continues the access control process and will thus unlock the car 3. The car 3 can be started in the same manner.

Figure 3:
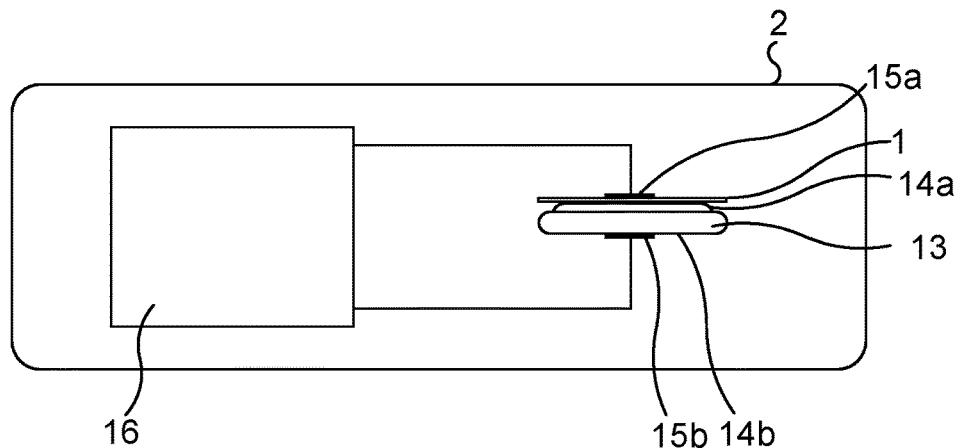
FIG. 3 is a schematic diagram illustrating an embodiment of a protection device for preventing a relay attack provided in the key fob of FIG. 1 or FIG. 2.

FIG. 3 is a schematic diagram illustrating an embodiment of a protection device for preventing a relay attack provided in the key fob of FIG. 1 or FIG. 2.

The key fob 2 comprises a battery 13 comprising a positive pole 14a and a negative pole 14b. There is a first power connector 15a for connection with the positive pole 14a and a second power connector 15b for connection with the negative pole 14b. The power connectors 15a-b are connected with circuitry 16 to thereby power the circuitry 16. The circuitry 16 comprises components of the key fob to allow it to function as known in the art per se, e.g. for communication and authentication with the car 3.

According to embodiments presented herein, it is provided a protection device 1 which can be provided between one of the poles 14a-b of the battery 13 and the respective power connector 15a-b, such that any power from the battery to the power connector needs to flow through the protection device 1. In other words, the protective device 1 is provided between the positive pole 14a and the first power connector 15a or the protective device 1 is provided between the negative pole 14b and the second power connector 15b. The protection device 1 is galvanically connected to one of the poles 14a-b and the power connector 15a-b. Optionally, the protection device 1 comprises the battery, which simplifies installation as well as distribution of the protection device 1.

As explained in more detail below, the protective device 1 can be controlled wirelessly, i.e. through the housing of the key fob, to be in either a conductive state or a blocking state. When in the conductive state, the protection device 1 allows the battery 13 to supply power to the circuitry 16 of the key fob 2, enabling the key fob 2 to function normally. When in the blocking state, the protection device 1 prevents the battery 13 from supplying power to the circuitry 16 of the key fob 2, whereby the key fob is effectively powered off. Hence, when the protective device 1 is in a blocking state, the key fob 2 is incommunicable, effectively preventing any relay attack.

Figure 4:
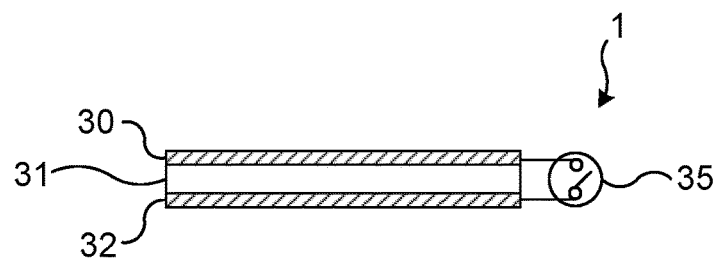
FIG. 4 is a schematic diagram illustrating components of the protection device of FIG. 3 according to one embodiment.

FIG. 4 is a schematic diagram illustrating components of the protection device 1 of FIG. 3 according to one embodiment. The protection device 1 is thin and provided in layers to allow retrofitting of the protection device 1 within a housing of the key fob 2.

The protection device comprises a first conductive layer 30, a second conductive layer 32 and an insulator layer 31 between the first conductive layer 30 and the second conductive layer 32. The insulator layer 31 prevents conductive contact between the first conductive layer and the second conductive layer.

A switch 35 is provided, conductively coupled between the first conductive layer 30 and the second conductive layer 32. The switch 35 is wirelessly controllable to be in a conductive state or a blocking state. In this embodiment, the switch is implemented as a reed switch. In this way, the user can apply a magnetic field from a permanent magnet to close the switch, to set the protective device 1 in a conductive state, whenever the key fob should be used. When the magnetic field is not applied, the reed switch is open, whereby the protective device 1 is in the blocking state, preventing any relay attack. Alternatively, the default state is that the switch is closed (i.e. conductive state), and when a magnetic field is applied, the switch opens.

By using the reed switch, a simple and robust solution is provided which still allows external wireless control using the magnetic field; the protection device 1 does not need any powered circuitry in this embodiment.

Figure 5:
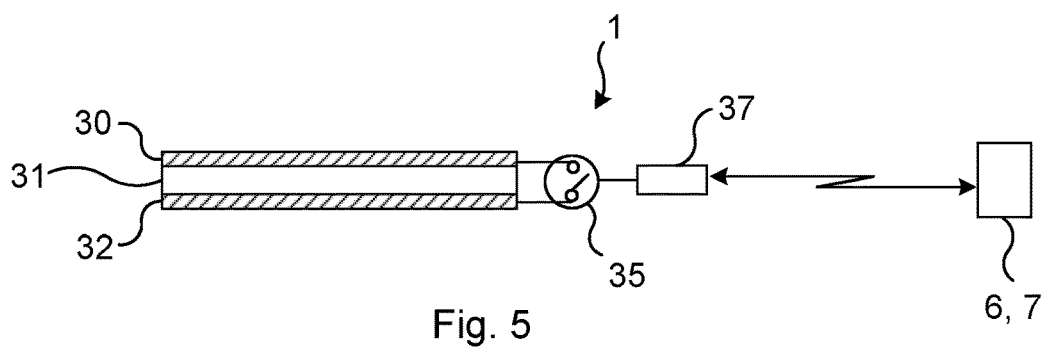
FIG. 5 is a schematic diagram illustrating components of the protection device of FIG. 3 according to one embodiment.

FIG. 5 is a schematic diagram illustrating components of the protection device 1 of FIG. 3 according to one embodiment. In this embodiment, the protective device 1 comprises a first communication module 37 is which configured to receive signals to control the state of the switch 35. The first communication module 37 can e.g. support communication using any one or more of inductive communication, Near-field communication (NFC), Bluetooth, Bluetooth Low Energy (BLE) or any of the IEEE (Institute of Electrical and Electronics Engineers) 802.15 standards or infrared (IR).

The first communication module 37 comprises suitable circuitry and antennas for communication as well as to control the state of the switch 35 based on the communication. The first communication module 37 can comprise processing capability, an application specific integrated circuit (ASIC) and/or a field programmable gate array (FPGA). In one embodiment, the first communication module 37 is implemented using a microcontroller unit (MCU). The first communication module 37 is powered by connecting to both poles of the battery of the key fob.

In one embodiment, the first communication module 37 is external to the key fob and the switch is a reed switch. The first communication module 37 then controls the state of the switch by generating a magnetic field. In this case, the first communication module 37 can have its own battery.

Figure 6:
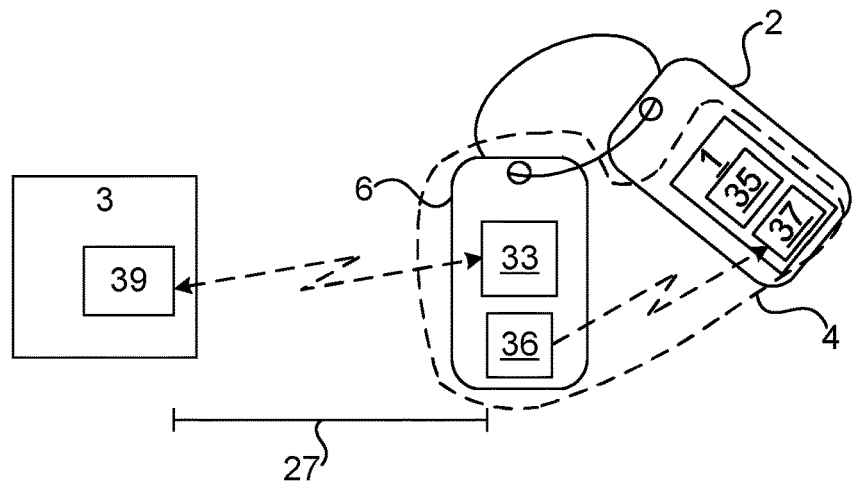
FIG. 6 is a schematic diagram illustrating a key control system also comprising a switch controller.
Figure 7:
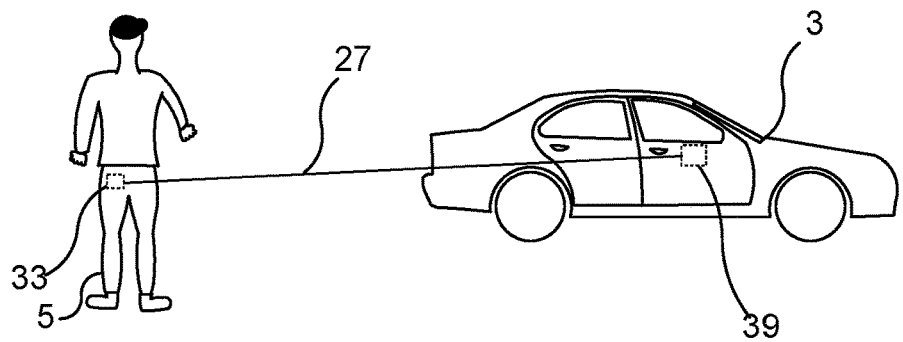
FIG. 7 is schematic diagram illustrating an example when distance to the protected object is used as an input parameter for controlling the switch.

The signals can be received by the first communication module 37 e.g. from a switch controller provided externally, e.g. as shown in FIGS. 6 and 7, described below. Alternatively, the first communication module 37 can receive signals from an application (i.e. app) executing on a smartphone 7. In this way, the user can control the state of the protection device by using the application. The commands can directly control the switch to set the protection device 1 in blocking mode or conductive mode as desired, controlled by the user using the app.

Furthermore, the commands can cause the protection device 1 to adopt a schedule, controlling when to be in the blocking state and when to be in a conductive state. The schedule is stored in the first communication module 37 and is applied to control the state of the protective state 1 accordingly. This allows the user to set a default schedule when the protection device should be in the conductive state, e.g. when the user typically uses the car to drive to or from work. At other times, the protection device is in the blocking state (unless manually changed using the application in the smartphone), during which relay attacks are prevented.

FIG. 6 is a schematic diagram illustrating a key control system 4 also comprising a switch controller 6.

The switch controller 6 comprises a second communication module 33 that is configured to determine a distance to a protected object, as described in more detail below with reference to FIG. 7. The switch controller 6 also comprises a third communication module 36 that is configured to communicate with the first communication module 37 of the protective device.

The second communication module 33 is configured to cooperate with a fourth communication module 39 installed in the protected object 3 to determine the distance 27 between the second communication module 33 and the fourth communication module 39. The fourth communication module 39 is installed in the protected object 3 in any suitable way, e.g. in a vehicle diagnostic socket (also known as on-board diagnostics connector) or a USB (universal serial bus) socket.

The second communication module 33 can be configured to cooperate with the fourth communication module 39 installed in the protected object 3 to determine the distance 27 based on time-of-flight measurements, such as those provided using UWB (ultra-wideband) communication. Alternatively or additionally, the second communication module 33 can be configured to cooperate with the fourth communication module 39 installed in the protected object 3 to determine the distance 27 based on multi-carrier phase-based ranging, also referred to as multiple carrier phase difference.

The switch controller 6 can be configured to close the switch 35 when the distance 27 is less than a threshold distance and open the switch 35 when the distance 27 is more than a threshold distance. Closing the switch implies setting the switch in a conductive state and opening the switch implies setting the switch in a blocking state. To close the switch, the switch controller 6 uses the third communication module 36 to communicate a closing signal to the first communication module 37 of the protective device 1, which closes the switch 35 upon receiving the closing signal. Analogously, to open the switch, the switch controller 6 uses the third communication module 36 to communicate an opening signal to the first communication module 37 of the protective device 1, which opens the switch 35 upon receiving the opening signal.

The threshold distances for opening and closing the switch can be the same. Alternatively, hysteresis is employed such that the threshold distance for opening is slightly shorter than the threshold distance for closing to avoid the switch opening and closing repetitively when the distance is at about the threshold.

The third communication module 36 can be configured to communicate with the first communication module 37 to control the switch using an inductive signal. By using the inductive signal to control the switch, a simple implementation is provided, which is also difficult for an attacker to emulate, especially from afar. Alternatively or additionally, an IR signal can be used.

FIG. 7 is schematic diagram illustrating an example when distance to the protected object is used as an input parameter for controlling the switch.

The user 5 carries a key fob and the switch controller, e.g. in a pocket or handbag. As described above, the second communication module 33 of the switch controller determines the distance 27 between the second communication module 33 of the switch controller and (the fourth communication module installed in) the protected object 3.

When the user is far away from the protected object 3 (a vehicle in this example), the switch controller communicates with the protection device installed in the key fob to open the switch, whereby the key fob is in an inactive state and cannot be used in a relay attack. When the user approaches the protected object 3 and is close enough, the switch controller communicates with the protection device installed in the key fob to close the switch, whereby the key fob is in an active state and is usable for passive access control, simplifying the process of the user gaining access to the vehicle. Significantly, the user does not need to perform any user input action for the protection against relay attacks. The protection is achieved based on the distance to the protected object 3.

Here now follows a list of embodiments from another perspective, enumerated with roman numerals.

i. A protection device for being provided inside a key fob to selectively inactivate the key fob, the protection device comprising:
  a first conductive layer;
  a second conductive layer;
  an insulator layer between the first conductive layer and the second conductive layer, the insulator layer preventing conductive contact between the first conductive layer and the second conductive layer; and
  a switch conductively coupled between the first conductive layer and the second conductive layer, the switch being wirelessly controllable to be in a conductive state or a blocking state.

ii. The protection device according to embodiment i, wherein the switch is a reed switch.

iii. The protective device according to embodiment i, further comprising a wireless communication module connected to the switch, wherein the communication module is configured to receive commands to control the state of the switch.

iv. The protective device according to embodiment iii, wherein the wireless communication module supports communication using any one of Near Field Communication, NFC, Bluetooth or Bluetooth Low Energy, BLE.

v. The protective device according to any one of the preceding embodiments, wherein the protection device is configured to be provided between a pole of a battery of the key fob and a power connector of the key fob.

vi. The protective device according any one of the preceding embodiments, further comprising a battery, wherein the protective device being provided in contact with one pole of the battery and a corresponding power connector.

vii. A key fob comprising a battery and the protective device according to any one of the preceding embodiments, the protective device being provided in contact with one pole of the battery and a corresponding power connector.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A protection device for being provided inside a key fob to selectively inactivate the key fob, the protection device comprising:
  a first conductive layer;
  a second conductive layer;
  an insulator layer between the first conductive layer and the second conductive layer, the insulator layer preventing conductive contact between the first conductive layer and the second conductive layer; and
  a switch conductively coupled between the first conductive layer and the second conductive layer, the switch being wirelessly controllable to be in a conductive state or a blocking state;
  wherein the protection device is configured to be provided between a pole of a battery of the key fob and a power connector of the key fob to thereby be configured to be installed inside the key fob between its battery and a power connector.

2. The protection device according to claim 1, wherein the switch is a reed switch.

3. The protective device according to claim 1, further comprising a first communication module connected to the switch, wherein the first communication module is configured to receive commands to control the state of the switch.

4. The protective device according to claim 3, wherein the first communication module supports communication using any one of Near-fields communication, NFC, Bluetooth, Bluetooth Low Energy, BLE or any of the IEEE 802.15 standards.

5. A key fob comprising a battery and the protective device according to claim 1, the protective device being provided in contact with one pole of the battery and a corresponding power connector.

6. A key control system comprising the protective device according to claim 3, and a switch controller, the switch controller comprising:
  a second communication module configured to determine a distance to a protected object; and
  a third communication module configured to communicate with the first communication module of the protective device;
  wherein the switch controller is configured to control the state of the switch of the protective device based on a distance between the switch controller and a protected object, wherein the state of the switch is controlled by the third communication module communicating a control signal to the first communication module;

wherein the second communication module is configured to cooperate with a fourth communication module installed in the protected object to determine the distance.

7. The key control system according to claim 6, wherein the second communication module is configured to cooperate with the fourth communication module installed in the protected object to determine the distance based on time-of-flight measurements.

8. The key control system according to claim 6, wherein the second communication module is configured to cooperate with the fourth communication module installed in the protected object to determine the distance based on multi-carrier phase-based ranging.

9. The key control system according to claim 6, wherein the switch controller is configured to close the switch when the distance is less than a threshold distance and open the switch when the distance is more than a threshold distance.

\* \* \* \* \*